May 28, 1929.  J. CASE  1,714,494
BUTTER CUTTER
Filed Nov. 17, 1927
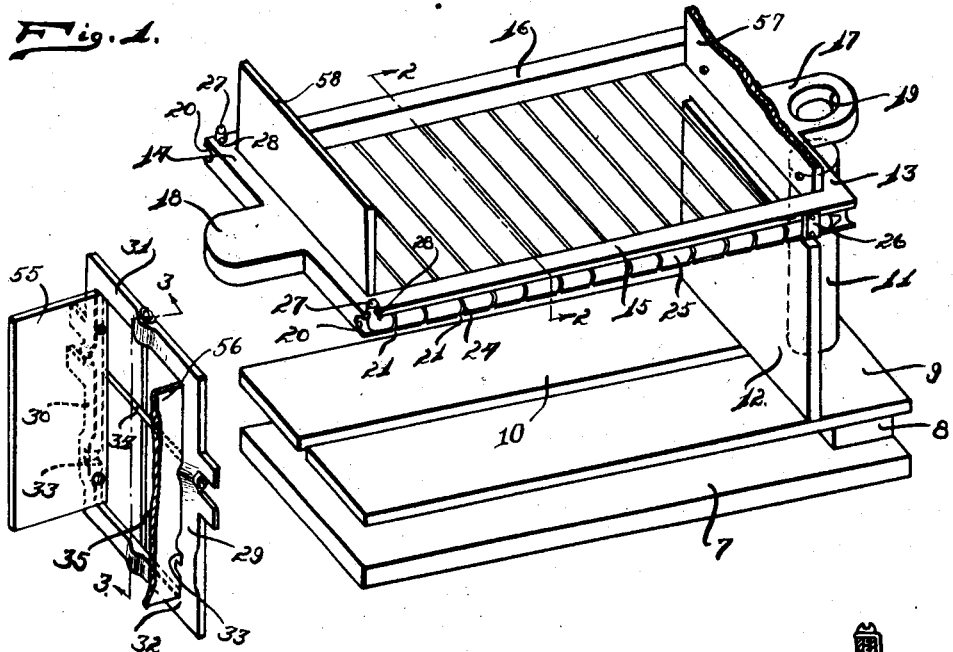
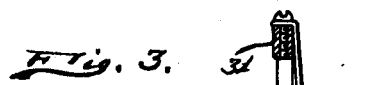
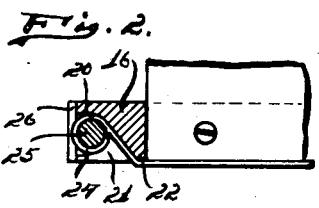
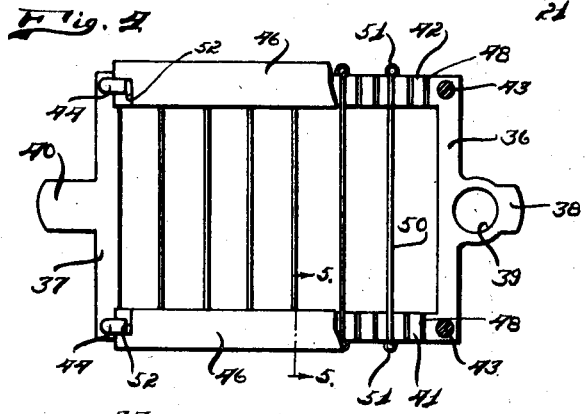
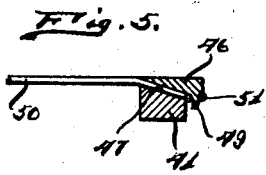
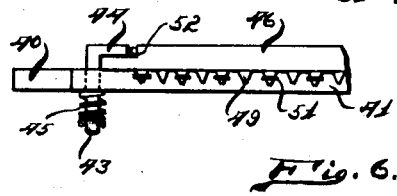
INVENTOR.
Joseph Case.
BY
ATTORNEY.

Patented May 28, 1929.

1,714,494

UNITED STATES PATENT OFFICE.

JOSEPH CASE, OF DETROIT, MICHIGAN.

BUTTER CUTTER.

Application filed November 17, 1927. Serial No. 233,806.

My invention relates to a new and useful improvement in a butter cutter, adapted for use in cutting large squares or pieces of butter into small squares such as are customarily used on the table in restaurants, hotels, etc.

In cutting the butter into small squares as now commonly practised, a wire cutting member is used which, after use, becomes corroded and breaks, so that frequent repair of these butter cutters becomes necessary.

It is an object of the present invention to provide a butter cutter in which the cutting elements may be very easily and quickly removed and replaced by even unskilled labor, so that the butter cutter may be maintained in operative condition for a maximum period of time with a minimum amount of trouble.

Another object of the invention is the provision of novel means for securing the cutting element on the frame.

Another object of the invention is the provision of a butter cutter which may be adjustable for cutting the butter into various thicknesses of squares.

Another object of the invention is the provision of a butter cutter which may be used independently or in conjunction with the usual butter platform used for stacking the butter squares thereon.

Another object of the invention is the provision of a butter cutter which will be simple in structure, economical of manufacture, easily and quickly repaired and easily operated.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention showing it in connection with a butter platform and a longitudinal cutting member.

Fig. 2 is a sectional view taken on line 2—2 of Fig. 1.

Fig. 3 is a sectional view taken on line 3—3 of Fig. 1.

Fig. 4 is a plan view of a modified form of the invention with parts broken away and parts shown in section.

Fig. 5 is a sectional view taken on substantially line 5—5 of Fig. 4.

Fig. 6 is a fragmentary, side elevational view of Fig. 4.

The invention is so constructed and arranged that it may be used with the butter platform upon which the butter is frequently placed after being cut into four elongated pieces, the butter usually being formed into pound blocks, and these blocks being divided longitudinally into four pieces. This platform comprises a base 7 upon which is mounted a spacing block 8 to which is secured at one end the spaced platform forming members 9 and 10, projecting upwardly from one end of which is the standard 11. Projecting upwardly from the upper surface of the members 9 and 10 is a plate or board 12.

The invention is illustrated as comprising a frame having end rails 13 and 14 and side rails 15 and 16, the end rails 13 and 14 having outwardly projecting lugs 17 and 18 respectively to afford gripping members, the lug 17 having an opening 19 formed therein for the reception of the standard 11.

As clearly appears in Fig. 1 and Fig. 2, the side rails are each provided with a longitudinally extending groove 20, extending into which, on one side of the rails 15 and 16, are transversely directed slots 21 to provide a shoulder 22 which engages the cutting element or wire 23, these wires being provided at opposite sides with an eyelet 24, projecting through which is a lock bolt 25 which is adapted to slidably engage in the groove 20, suitable plates 26 being secured to the side rails 15 and 16 to retain the bolts 25 in engagement in the groove 20. One end 27 of the bolt 25 is angularly turned to provide a gripping portion and adapted to engage, when in one position, in a recess 28 formed in the side rails 15 and 16, thus locking the bolt 25 against longitudinal movement.

In assembly the cutting elements 23 are positioned each in engagement with registering slots 21 formed in the side rails 15 and 16 and the bolt 25 projected through the eyelet 24 formed thereon.

It is believed evident that the removal and replacement of one of the cutting elements 23 is a very simple operation, which is believed understood from the description given.

The cutting member for slicing the block into longitudinal pieces is illustrated in Fig.

1 and comprises a frame having side rails 29 and 30, each provided, on its inner face, with a recess 33, these side rails being connected by end rails 31 and 32. Extending between the rails 31 and 32, centrally thereof, is a cutting element 35 which is secured, as shown in Fig. 3, by screws threaded into these rails. A similarly secured cutting element 34 extending between the rails 29 and 30, and extending outwardly from these rails are spaced lugs to afford a gripping portion.

In operation, the block of butter would be placed on the members 9 and 10 and the rail 32 placed upon the base 7 so that the edges of the members 9 and 10 will engage in the recesses 33. A sliding of this frame toward the member 12 will, it is evident, divide the butter into four pieces, upon which the frame comprising the rails 31 and 32 may be removed and the cutter comprising the rails 13 and 14 slid downwardly, the standard 11 engaging in the opening 19, thus dividing the butter into the squares of the proper dimension.

In Fig. 4 I have shown a slightly modified form in which the cutting element comprises the end rails 36 and 37 connected by suitable side rails 41 and 42. A lug 38 projects outwardly from the end rail 36 and is provided with the opening 39, while a lug 40 projects outwardly from the rail 37 to provide a suitable gripping member. The cutting elements 50 are provided at opposite ends with eyelets 51 and adapted to engage in aligning slots 48 formed in the side rails 41 and 42. As shown clearly in Fig. 5, the side rails 41 and 42 are beveled on their upper surface 47. Covers 46 are provided for the side rails, each of these covers being provided with downwardly projecting lugs or studs 49 which are adapted to register with the slots 48 formed in the side rails. These covers 46 extending longitudinally of the side rails are each provided at opposite ends with recesses 52 in which engage the angularly turned portions 44 of the bolts 43 which are projected through the rails 36 and 37 at the end thereof, a coil spring 45 embracing the bolts 43 and serving to retain the angularly turned portion in clamping relation on the recesses 52, so that the covers 46 are firmly held in position on the side rails, the lugs 49 engaging in the eyelets 51 of the cutting elements 50 and serving to lock them in position.

In order to remove the cutting element with the device as shown in this form it is but necessary to remove the cover so as to disengage the projections 49 from the eyelets and replace the cutting element.

It is believed obvious that these cutting elements may be spaced from each other as desired by selecting the slot 48 in which they shall be positioned, so that the thickness of the squares of butter to be cut may be easily and quickly determined.

Thus I have provided an adjustable butter cutter adapted for cutting different thicknesses of squares.

Projecting outwardly from one face of the side rails 29 and 30 are plates 55 and 56 which serve to maintain the elongated pieces of butter in alignment and prevent their lateral displacement.

Projecting upwardly from the side rails 13 and 14 are end plates 57 and 58 which serve, when the frame comprising the end rails 13 and 14 is used singly, to align the squares of butter and prevent their displacement laterally.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A butter cutter of the class described, comprising: a frame having oppositely positioned side rails and oppositely positioned end rails; a plurality of individual cutting elements extending across said frame and engaging a pair of said oppositely positioned rails, the surfaces of said rails engaged being beveled; covers for said engaged rails having their inner surfaces beveled and retaining said cutting elements in engagement with said beveled surfaces of said oppositely positioned rails; and means for locking said covers in position over said engaged rails.

2. A butter cutter of the class described, comprising: a frame having oppositely positioned side rails and oppositely positioned end rails; a plurality of individual cutting elements extending across said frame and engaging a pair of said oppositely positioned rails, the surfaces of said rails engaged being beveled; covers extending over said engaged rails and pressing said cutting elements into engagement with the beveled surfaces thereof, the surfaces of said covers engaging said cutting elements being beveled; an eyelet formed on the opposite end of each of said cutting elements; a plurality of studs on said covers, each engaging in one of said eyelets; and means for locking said covers in position over said engaged rails.

In testimony whereof I have signed the foregoing specification.

JOSEPH CASE.